United States Patent [19]

Shih

[11] Patent Number: 5,219,924
[45] Date of Patent: Jun. 15, 1993

[54] PROCESS FOR THE PRODUCTION OF PAPER COATING BINDERS

[75] Inventor: Yen-Jer Shih, Somerset, N.J.

[73] Assignee: National Starch and Chemical Investment Holding Corporation, Wilmington, Del.

[21] Appl. No.: 722,644

[22] Filed: Jun. 28, 1991

[51] Int. Cl.$^5$ .................... C08L 33/04; C08L 31/00
[52] U.S. Cl. ................................ 524/832; 524/813
[58] Field of Search ............. 524/832, 813; 523/351

[56] References Cited

U.S. PATENT DOCUMENTS 4,659,595 4/1987 Walker et al. ................... 428/513
4,737,386 4/1988 Wotier et al. ................... 524/555
4,911,960 3/1990 Mudge et al. ................... 523/502

*Primary Examiner*—Joseph L. Schofer
*Assistant Examiner*—Jeffrey T. Smith
*Attorney, Agent, or Firm*—Ellen T. Dec; Edwin M. Szala

[57] ABSTRACT

An improved process for the production of paper coating binders wherein ethylene, vinyl ester and optional comonomers are polymerized using batch emulsion polymerization techniques and wherein the improvement comprises subjecting the emulsion to microfluidization to produce a particle size of less than about 0.5 microns prior to the emulsion polymerization step.

7 Claims, No Drawings

PROCESS FOR THE PRODUCTION OF PAPER COATING BINDERS

BACKGROUND OF THE INVENTION

Paper coating binders are commonly used in the production of coated cellulosic webs. Thus, in such constructions pigment as well as other optional components are formulated into a pigment "slip" which is then compounded with the binder to produce a coating "color" used for coating the paper or paperboard web. Since large quantities of the binder are used, it is important that the binder impart certain desirable physical properties including brightness, smoothness, gloss, good finish and feel to the paper. Additionally, the color must have the proper rheological properties so that it can be applied to the web at high speed using conventional equipment. Finally, the coating must have high strength to permit subsequent printing on the coated paper without undesirable "picking" or lifting of the fibers during the printing process.

Paper coating binders comprising ethylene vinyl ester copolymers, optionally formulated with other multifunctional comonomers, have been successfully utilized in such applications as exemplified in U.S. Pat. Nos. 3,716,504; 3,404,112; 3,645,952; EP 140,227 and the like. In order to prepare ethylene vinyl acetate emulsion binders having high strength, it is necessary to employ a batch polymerization. However, the use of such batch polymerization results in a broad particle size distribution in the polymer, leading to rheological problems. In contrast, if a semi-continuous polymerization is employed, the rheology problems are not encountered but the polymer is produced at a low molecular weight and consequently does not provide sufficient strength.

I have now found that when the ethylene vinyl ester containing binder emulsions are prepared by conventional batch polymerization using microfluidization processes, the resulting emulsions not only have high strength but also have a narrower particle size distribution giving better rheological and strength properties. Thus the present invention is directed to an improved process for the production of paper coating binders wherein ethylene, vinyl ester and optional comonomers are polymerized using batch emulsion polymerization techniques and wherein the improvement comprises subjecting the emulsion to microfluidization to produce a particle size of less than about 0.5 microns prior to the emulsion polymerization step.

The improved process is applicable to the production of any vinyl ester ethylene based emulsion binders, the general processes for the preparation thereof being described in U.S. Pat. Nos. 3,716,504; 3,404,112; 3,645,952 and EP 140,227, the disclosures of which are incorporated herein by reference.

While vinyl acetate is the most readily available vinyl ester used in paper coating binders, other $C_1$–$C_{13}$ esters may also be used in amounts of 70 to 95% by weight of the copolymer. The ethylene component is generally present in levels of 5 to 30%, preferably 15 to 25% by weight. Optionally functional comonomers such as triallyl cyanurate, triallyl isocyanurate, diallyl maleate, diallyl fumarate, allyl glycidyl ether, divinyl benzene and diallyl phthalate may also be used at levels of 0.05 to 0.5% by weight.

It is also most desirable to incorporate in the emulsion copolymer 0.5 to 5% of a carboxyl or amide functionality. Examples of suitable ethylenically unsaturated mono- or di-carboxylic acid or half ester acids include the monocarboxylic ethylenically unsaturated acids such as acrylic, vinyl acetic, crotonic, methacrylic, tiglic, etc; the dicarboxylic ethylenically unsaturated acids such as maleic, fumaric, itaconic, maleic, citraconic, hydromuconic, allylmolonic, etc. as well as the half esters of these dicarboxylic acids such as mono(2-ethylhexyl)maleate, monoethyl maleate, monobutyl maleate, etc.

Useful amides are the amides of a, $\beta$-olefinically unsaturated carboxylic acids such as acrylamide, methacrylamide, and diacetone acrylamide; N-alkylol amides of a, $\beta$-olefinically unsaturated carboxylic acids such as N-methylol acrylamide and N-methylol methacrylamide; N-alkoxyalkyl amines of a, $\beta$-olefinically unsaturated carboxylic acids such as N-methoxymethyl acrylamide and N-butoxymethyl methacrylamide.

It may also be desirable to additionally incorporate into the emulsion polymer 0.01 to 3 parts per 100 parts by weight of an organo-functional silane which will either participate directly in the reaction by free-radical polymerization or will enter into a condensation reaction with other groups already present in the polymer backbone. Typical of silanes of the first group are, for example, the vinyl or mercaptosubstituted silanes which will copolymerize with the vinyl acetate polymer. Representative commercially available silanes of the first class include vinyltrichlorosilane, vinyltriethoxysilane, vinyltrimethoxysilane, vinyltris(2-methoxyethoxy)silane, gamma-methacryloxy-propyltrimethoxysilane, gamma-methacryloxy-propyltris-(2-methoxyethoxy) silane, vinyltriacetoxysilane and gammamercaptopropyltrimethoxysilane. Typical of the second group of silanes are the glycidyl containing silanes which can react with other functional groups already present on the polymer, for example, the carboxyl groups. Representative of this type of silane monomer are gamma-glycidoxy-propyltrimethoxysilane, beta-(3,4-epoxycyclohexyl)-ethyltrimethoxysilane.

To prepare the emulsion polymers according to the invention, most or all of the major monomers are admixed with stirring or other agitation into the aqueous phase containing an emulsifying agent and/or protective colloid, desirably at room temperature. The resulting crude emulsion of coarse polymer phase droplets is then subjected, at temperatures similar to those specified for the initial emulsification, to the action of comminuting forces sufficient to enable the production of an aqueous microfluidized emulsion containing polymer particles averaging less than about 0.5 u, desirably less than about 0.3 u to about 0.1 u or lower. Means for applying such comminuting forces are well known in the art and are a matter of judicious selection in carrying out the present process. Such forces may be of any type, e.g. shear, attrition, impact, explosion, implosion or any combination thereof. A number of types of devices for subjecting the crude emulsion to these comminuting forces are commercially available, including the Microfluidics and Manton-Gaulin microfluidizers, i.e., the Manton-Gaulin Model 15M-8TA Laboratory Homogenizer and Submicron Disperser (Manton-Gaulin Co.). The crude emulsion is forced through a small orifice at pressures up to 16,000 psi. In the case of the Manton-Gaulin Homogenizer, the rapid increase in velocity between the valve stem and seat causes cavitation of the liquid and the formation of bubbles; the collapse of these bubbles sets the valve stem into vibration at high frequencies (20-50 kilocycles/sec.), which breaks the emulsion droplets to a smaller size. The homogenized emulsion can be recycled through the orifice by use of a three-way valve in the device to direct it back to the supply tank. When the Microfluidics Microfluidizer M-110 is used, the feed stream is pumped into a specially designed chamber in which fluid sheets interact at ultrahigh velocities and pressures up to 1500 ft/second and 16,000 psi, respectively. The fixed microchannels within the chamber provide an extremely focused interaction zone of intense turbulence causing the release of energy amid cavitation and shear forces.

The above described crude emulsion is passed or recycled through such microfluidizer comminuting device a sufficient number of times, usually two, three or more times, until an emulsion is obtained containing the desired small size polymer phase particles.

The resulting microfluidized emulsion is then polymerized using conventional batch emulsion polymerization procedures in an aqueous medium using a free-radical catalyst and a surfactant, the aqueous system being maintained by a suitable buffering agent, if necessary, at pressures of 10 to 130 atmospheres as taught, for example, in U.S. Pat. Nos. 3,708,388; 3,404,112 and 3,716,504. The ethylene content of the polymer depends on the ethylene content of the aqueous polymerization medium. Factors which control the ethylene content of the polymerization medium include the partial pressure of ethylene in the vapor phase over the medium, the temperature of the polymerization and the degree of mixing between the vapor phase and the liquid medium. Generally, the polymerization is performed at temperatures from 120° to 175° F., and, at these temperatures, ethylene partial pressures from 50 to 1,500, preferably from 240 to 1,000 psig, are sufficient to incorporate from 1 to 30, preferably from 5 to 25, weight percent ethylene in the polymer. Preferably the ethylene partial pressure is maintained constant throughout the polymerization period so that this monomer is continuously supplied at a constant rate.

The polymerization is typically initiated by a free radical initiator such as water soluble peracid or salt thereof, e.g., hydrogen peroxide, peracetic acid, persulfuric acid or the ammonium and alkali metal salts thereof, e.g., ammonium persulfate, sodium peracetate, lithium persulfate, potassium persulfate, sodium persulfate, etc. Alternatively, organic peroxides such as benzoyl peroxide, t-butyl hydroperoxide, etc., may also be employed. A suitable concentration of the initiator is from 0.05 to 5.0 weight percent and preferably from 0.1 to 3 weight percent.

The free radical initiator can be used alone and thermally decomposed to release the free radical initiating species or can be used in combination with a suitable reducing agent in a redox couple. The reducing agent is typically an oxidizable sulfur compound such as an alkali metal metabisulfite and pyrosulfite, e.g., sodium metabisulfite, sodium formaldehyde sulfoxylate, potassium metabisulfite, sodium pyrosulfite, etc. The amount of reducing agent that can be employed throughout the copolymerization generally varies from about 0.1 to 3 weight percent of the amount of polymer. In the case of polymers containing functional comonomers, the comonomers are added gradually with the initiator, either in an aqueous solution or, if not water soluble, dissolved in a small amount of vinyl acetate.

The polymerization is carried out at a pH of between 2 and 7, preferably between 3 and 5. In order to maintain the pH range, it may be useful to work in the presence of customary buffer systems, for example, in the presence of alkali metal acetates, alkali metal carbonates, alkali metal phosphates. Polymerization regulators, like mercaptans, aldehydes, chloroform, methylene chloride and trichloroethylene, can also be added in some cases.

The dispersing agents are all the emulsifiers generally used in emulsion polymerization, as well as optionally present protective colloids. It is also possible to use emulsifiers alone or in mixtures with protective colloids.

The emulsifiers can be anionic, cationic or nonionic surface active compounds. Suitable anionic emulsifiers are, for example, alkyl sulfonates, alkylaryl sulfonates, alkyl sulfates of hydroxylalkanols, alkyl and alkylaryl disulfonates, sulfonated fatty acids, sulfates and phosphates of polyethoxylated alkanols and alkylphenols, as well as esters of sulfosuccinic acid. Suitable cationic emulsifiers are, for example, alkyl quaternary ammonium salts, and alkyl quaternary phosphonium salts. Examples of suitable non-ionic emulsifiers are the addition products of 5 to 50 mols of ethylene oxide adducted to straight-chained and branch-chained alkanols with 6 to 22 carbon atoms, or alkylphenols, or higher fatty acids, or higher fatty acid amides, or primary and secondary higher alkyl amines; as well as block copolymers of propylene oxide with ethylene oxide and mixtures thereof. When combinations of emulsifying agents are used, it is advantageous to use a relatively hydrophobic emulsifying agent in combination with a relatively hydrophilic agent. The amount of emulsifying agent is generally from about 1 to 10, preferably from about 2 to about 8, weight percent of the monomers used in the polymerization.

The emulsifier used in the polymerization can also be added in its entirety to the initial charge to the polymerization zone or a portion of the emulsifier, e.g., from 25 to 90 percent thereof, can be added continuously or intermittently during polymerization.

Various protective colloids may also be used in place of or in addition to the emulsifiers described above. Suitable colloids include partially acetylated polyvinyl alcohol, e.g., up to 50 percent acetylated, casein, hydroxyethyl starch, carboxymethyl cellulose, gum arabic, and the like, as known in the art of synthetic emulsion polymer technology. In general, these colloids are used at levels of 0.05 to 4% by weight based on the total emulsion.

The polymerization reaction is generally continued until the residual monomer content is below about 1%. The completed reaction product is then allowed to cool to about room temperature while sealed from the atmosphere.

The emulsions are produced and used at relatively high solids contents, e.g., between 35 to 70%, although they may be diluted with water if desired.

The actual paper coating composition comprises the interpolymer latex together with a pigment, such as clay and the usual paper coating additives which may include other co-binders, such as polyvinyl alcohol, protein, e.g., casein or soy protein, or starch, as is well known to those skilled in the art.

The pigment used in the paper coating compositions may be any of those conventionally employed. Generally, at least a portion of the pigment comprises clay and for this portion any of the clays customarily used for paper coating, including the hydrous aluminum silicates of kaolin group clays, hydrated silica clays, and the specific types of clays recommended in Chapters 10-16 of "Kaolin Clays and their Industrial Uses," by J. M. Huber Corp. (1949), New York, N.Y. In addition to clay itself, there may be utilized other paper pigments such as, for example, calcium carbonate, titanium dioxide, blanc fixe, lithophone, zinc sulfide, or other coating pigments including plastics, for example polystyrene, in various ratios, e.g., up to 50%, preferably up to 35%, by weight of the clay. Additionally, the composition may also contain other additives such as zinc oxide and/or a small amount, of a dispersing or stabilizing agent such as tetrasodium pyrophosphate. In general, the paper coating composition comprises 100 parts pigment containing 65-100 parts clay and 0-35 parts secondary pigment; 0.01-0.5 parts dispersing or stabilizing agent; 3-30 parts interpolymer latex (solids basis); 0-25 parts cobinder; interpolymer latex (solids basis); 0-25 parts cobinder; 0.0.2 parts defoamer and sufficient water to provide the desired level of solids. The modification and formulation of the coating color using these materials will be within the knowledge of those skilled in the art. The coating compositions produced herein may be applied to fibrous paper webs using any of the conventional coating devices including, but not limited to, those referred to as trailing blade coaters, air knife coaters, roll coaters and the like.

The invention will now be more specially illustrated by reference to the following examples of practical application, it being understood that these examples are given for illustrative purposes only and are not to be constructed as limiting the invention.

EXAMPLE 1

This example illustrates the novel process of preparing latex as a paper coating binder via a microfluidization process. The polymerization was carried out in a 8-liter stainless steel reactor. The following charges were prepared.

(A) 1750 g water, 350 g Triton X-301 (a product of Union Carbide), 60 g Triton X-405 (a product of Union Carbide), 36 g sodium vinyl sulfonate (SVS, 25% solution), 2.5 g sodium acetate, 1 g sodium formaldehyde sulfoxylate (SFS), 2.5 g $FeSO_4.7 H_2O$ (1%), 40 g dodecyl benzene sulfonate (20%), and adjust to 3.4 pH by phosphoric acid.

(B) 2000 g vinyl acetate and 4 g diallyl maleate.

(C) 250 g water and 12.5 g ammonium persulfate.

(D) 250 g water and 7.5 g SFS.

(E) 20 g water and 2 g t-butyl hydrogen peroxide (t-BHP).

(F) 40 g water and 2 g SFS.

(G) 124.8 g water and 115.2 g maleic acid (25%).

Charge B was emulsified into Charge A with a regular mixer. The preemulsion was then microfluidized in a lab scale M-110T type (Microfluidics Corp.) for 3 cycles at about 80 psi air (equivalent to about 11,000 psi in the internal reaction chamber), and charged to the reactor. At 40° C., the reactor was pressurized with ethylene to 750 psi and equilibrated at this temperature for 15 minutes. Charges C and D were started at 50° C. After initiation, Charge G was added uniformly for 2 hours, and the reaction temperature was allowed to increase to 65° C. After the addition was completed, the reactants were cooled to 50° C. and blown to a stripper. Charges E and F were then added. Thirty minutes later, the mixture was cooled and discharged next day. The resulting latex had 44.8% solids, 164 nm particle size, 47 cps, and −8° C. Tg.

EXAMPLE 2

This example illustrates the preparation of emulsion polymers containing other functional monomers in accordance with this present invention. The following charges were prepared.

(A) 1400 g water, 280 g Triton X-301 (a product of Union Carbide), 48 g Triton X-405 (a product of Union Carbide), 28.8 g SVS (25%), 3 g sodium acetate, 0.8 g SFS, 2 g $FeSO_4.7 H_2O$ (1%), 32 g dodecyl benzene sulfonate (20%), and adjusted to 3.2 pH by phosphoric acid.

(B) 1600 g vinyl acetate and 3.2 g diallyl maleate.

(C) 160 g water, and 10 g ammonium persulfate.

(D) 160 g water and 6 g SFS.

(E) A preemulsion of 120 g water, 37.6 g Gafac RE-610 (a product of Rhone-Poulenc) (20%), 44 g dodecyl benzene sulfonate (20%), 32 g Triton X-405, 11 g mono ethyl maleate, 4.5 g silane A-174 (a product of Union Carbide), 600 g vinyl acetate, 0.8 g triallyl cyanurate, and 44 g maleic acid (25%).

(F) 12 g water and 2 g t-BHP.

(G) 40 g water and 2 g SFS.

Charge B was emulsified into Charge A with a regular mixer. The preemulsion was then microfluidized for 3 cycles at about 80 psi air, and charged to the reactor. At 40° C., the reactor was pressurized with ethylene to 750 psi and equilibrated at this temperature for 15 minutes. Charges C and D were started at 50° C. After initiation, the reaction temperature was allowed to increase to 65° C. When ΔT is about 3° to 5° C., Charge E was slow-added over 1.5 hours. After the addition was completed, the reactants were cooled to 50° C. and blown to a stripper. Charges F and G were then added. Thirty minutes later, the mixture was cooled and discharged next day. The resulting latex had 47.8% solids, 152 nm particle size, 156 cps, and −8° C. Tg.

EXAMPLE 3

For comparison purposes, the procedure of Example 1 was repeated, except no microfluidization was employed. The resulting latex, designated Emulsion 3, had 44.8% solids, 158 nm particle size, 45 cps in viscosity and −8° C. Tg. A control polymer, designated Emulsion 4, is a commercially available, relatively expensive, carboxylated vinyl acrylic polymer, the performance of which is designated as a target for the relatively less expensive binders prepared according to the invention. Also, for comparison purposes, an ethylene vinyl acetate polymer containing 0.15% triallyl cyanurate was prepared using conventional semi-continuous polymerization procedures and without microfluidization. This polymer was designated Emulsion 5.

A coating color was prepared by conventional means to provide the following composition:

| | |
|---|---|
| predispersed HT (kaolin) clay | 100 parts |
| Tetrasodium pyrophosphate | 0.15 part |
| Dispex N-40 (a product of Allied Colloids) | 0.15 part |
| Carboxyl methyl cellulose | 0.3 part |
| Latex of Examples 1-4 | 16-18 parts |
| water and ammonia solution | |
| adjust the solids to 65% and 8.5 ph | |

The coating color was applied to a bleached board to a final coat weight of 3.3 lbs. of dry coating per ream (1000 square feet of surface area). The sheets were dried for 20 seconds at 260° F. and then calendared at 170° F., 200 pli.

The finished sheets were tested as follows:

75° Gloss was measured using a Gardner Glossmeter.

Dry strength values on paperboard were determined using an IGT Dynamic Pick Tester, various inks as indicated, a "B" spring setting and a 35 kg. load.

A rheology test was performed using a Hercules high shear viscometer by measuring the displacement, in centimeters, going from 0 to 4,400 rpm. This cycle was repeated twice so values are shown for both a first and second curve. Lower values are preferred.

|  | Emulsion 1 | Emulsion 2 | Emulsion 3 | Emulsion 4 | Emulsion 4 | Emulsion 5 |
|---|---|---|---|---|---|---|
| 75° Gloss | 49.5 | 49.0 | 50.0 | 48.8 | N/A | N/A |
| IGT (f.p.m.) | 310[1] | 325[1] | 280[1] | 325[1] | 892[2] | 675[2] |
| Hercules Displacement (cm) |  |  |  |  |  |  |
| First Curve | 10.4 | 10.4 | 13.9 | 10.6 | 9.0 | 8.2 |
| Second Curve | 8.5 | 9.6 | 11.5 | 9.8 | 8.6 | 7.9 |

[1]Tested using No. 5 ink.
[2]Tested using No 2 ink and a paper coating formulation comprising 100 parts #2 hydraseperse clay, 0.1 parts tetrasodium pyrophosphate, 4 parts Penford Gum 290 (a product of Penford Product Co., div. of Penwest), 12 parts latex and sufficient water and ammonia to 60% solids, 8.5 pH.

As the results presented in the above Table show, polymers prepared using a batch polymerization technique but without microfluidization (Emulsion 3) exhibit acceptable strength but poor rheology properties as compared both to the vinyl acrylic target control and to the similarly prepared but microfluidized Emulsion 1 of the invention. Further, the polymer prepared using semi-continuous techniques, but again without microfluidization (Emulsion 5) exhibited adequate rheology but was deficient in strength when compared with the control. It is to be noted that the higher values achieved in Emulsion 4 (second testing) and 5 are a result of the change in coating color formulation and cannot be compared directly with that of Emulsion 1, 2, 3 and 4 (first testing).

What is claimed is:

1. In a process for the batch or semi-batch preparation of pigmented paper coating compositions comprising an aqueous synthetic polymer latex binder and pigment wherein the latex has dispersed therein a vinyl ester ethylene based emulsion polymer, the improvement which comprises the steps of forming a pre-emulsion containing the vinyl ester and any optional monomers by agitating in an aqueous phase containing an emulsifying agent; subjecting the pre-emulsion to microfluidization to produce a particle size less than about 0.5 microns prior to the emulsion polymerization step; and subsequently emulsion polymerizing the monomers under ethylene pressure of 10 to 130 atmospheres.

2. The process of claim 1 wherein the vinyl ester in the emulsion polymer is vinyl acetate.

3. The process of claim 1 wherein the vinyl ester is present in an amount of 70 to 95% by weight of the emulsion polymer.

4. The process of claim 1 wherein there is additionally present in the emulsion polymer 0.05 to 0.5% by weight of a functional comonomer selected from the group consisting of triallyl cyanurate, triallyl isocyanurate, diallyl maleate, diallyl fumarate, allyl glycidyl ether, divinyl benzene and diallyl phthalate.

5. The process of claim 1 wherein there is additionally present in the emulsion polymer 0.5 to 5% by weight of a carboxyl or amide functionality.

6. The process of claim 1 wherein there is additionally present in the emulsion polymer 0.01 to 3 parts per 100 parts by weight of the polymer of an organo-functional silane.

7. The process of claim 1 wherein the emulsion is microfluidized to a particle size of less than 0.3 microns.

* * * * *